G. S. Hull.
Fruit-Mill.

N° 74365. Patented Feb. 11, 1868

Witnesses.

Inventor.
George S. Hull
By R. H. March, atty

UNITED STATES PATENT OFFICE.

GEORGE S. HULL, OF WASHINGTON, IOWA

Letters Patent No. 74,365, dated February 11, 1868.

IMPROVED FRUIT-MILL.

The Schedule referred to in these Letters Patent and making part of the same.

TO WHOM IT MAY CONCERN:

Be it known that I, GEORGE S. HULL, of Washington, county of Washington, State of Iowa, have invented new and useful Improvements in Machines for Grinding Grapes, Currants, and other small fruits, whereby the crushing of the seeds and stems is obviated; and I do hereby declare the following to be a full and exact description of the same, reference being had to the drawings that accompany and form a part of these specifications, in which—

Figure 1:
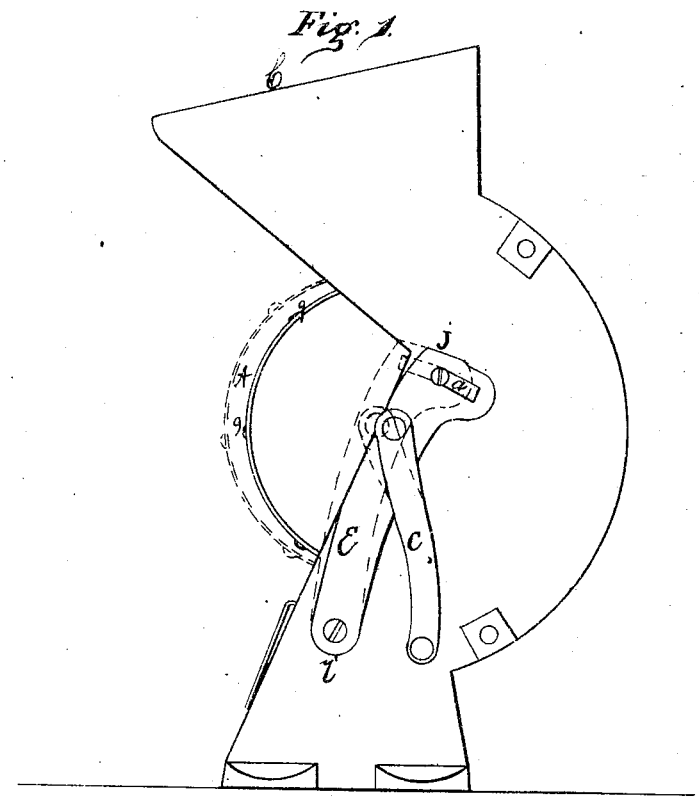
Figure 2:
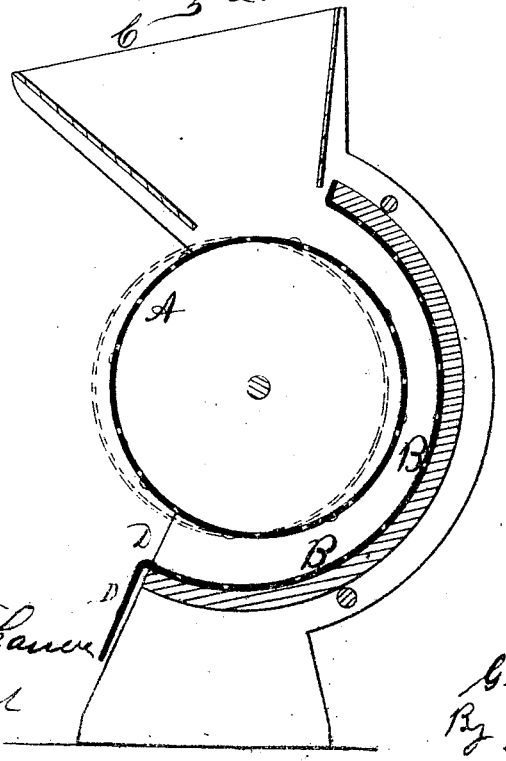

Figure 1 is an end elevation, showing the working-crank and the means of adjusting the crushing-roller.
Figure 2, sectional view, cutting the crushing-roller, the hopper, and other parts crosswise.
Letter A, a roller, a foot or so in length, and about the same in diameter.
Letter B, a plate or block with the side toward the roller concave to correspond thereto.
Letter C, the hopper, from which the fruit is fed to the mill.
Letter D, place of discharge for the mashed fruit.
Letter $b$, shaft of the cylinder A.
Letter $c$, working-crank.
Letter $e$, a standard, in which are rests for the journal $b$, its lower end being firmly attached to the side of the general frame by screw or bolt $i$; and being provided, near its upper end, with the slot $a$, it provides for adjusting the cylinder A through the aid of the set-screw $j$.
Letters $g$ $g$ are short teeth on the outer surface of the cylinder A and the inner surface of B, whose office is to feed and aid in mashing the fruit.
In structure, the outer part and frame should be of wood, and of dimensions to correspond to proposed size of the interior parts.
The cylinder A may be of wood, with teeth driven in, left projecting very slightly from the surface, or it may be of wood covered with metal, on which teeth are raised by indentation or puncture from the inside, or the covering-sheets may be cast metal, on which there are numerous slightly-raised teeth. In the same way may the concave surface of B be formed, or the cylinder and the plate B, one or both, may be formed of metal entire. It would be well that whatever iron were used should be plated or galvanized with zinc or some metal not easily acted on by the acid of the fruit.
When used, the cylinder A is made to run as near to the concave surface of B as the size of the fruit and the degree of fineness desired in the mash would indicate. As the cylinder rests in the stumps $e$ $e$, one on each end of the frame, the adjustment is secured by loosening the screw $j$ and swinging the cylinder in and out, as indicated by the red lines in fig. 1.
What I claim as of my invention, and desire to secure by Letters Patent, is—
The combination and arrangement of the concave plate B, the cylinder A, and the adjustable stirrup $e$, substantially as and for the purposes described and set forth.

G. S. HULL.

Witnesses:
JOHN H. HOLDEN,
W. A. GUSEMAN.